United States Patent [19]

Beim

[11] Patent Number: 4,706,519

[45] Date of Patent: Nov. 17, 1987

[54] CREEPER SPEED ACTUATOR FOR A TRACTOR TRANSMISSION

[75] Inventor: Rudolf Beim, Southfield, Mich.

[73] Assignee: Ford Motor Company, Dearborn, Mich.

[21] Appl. No.: 818,510

[22] Filed: Jan. 13, 1986

[51] Int. Cl.$^4$ .......................... B60K 41/22; F16H 3/08
[52] U.S. Cl. ........................................ 74/745; 74/359; 192/3.63
[58] Field of Search ...................... 74/861, 878, 473 R, 74/471 R, 745, 359; 192/20, 21, 48.1, 51, 67 R, 4 C, 3.63

[56] References Cited

U.S. PATENT DOCUMENTS

| | | | |
|---|---|---|---|
| 2,975,656 | 3/1961 | Haverlander | 74/745 |
| 3,105,395 | 10/1963 | Perkins | 74/331 X |
| 3,422,939 | 1/1969 | Biabaud | 74/335 X |
| 3,897,699 | 8/1975 | Hoyer | 74/745 |
| 3,916,711 | 11/1975 | Hoyer | 74/745 |
| 4,068,537 | 1/1978 | Wolfe | 74/360 X |
| 4,273,001 | 6/1981 | Miyahara et al. | 74/473 R X |
| 4,304,155 | 12/1981 | Want et al. | 74/360 X |
| 4,375,172 | 3/1983 | Richards et al. | 74/331 X |
| 4,440,037 | 4/1984 | Foxton et al. | 74/473 R X |
| 4,498,356 | 2/1985 | Vater et al. | 74/360 X |
| 4,603,596 | 8/1986 | Akashi et al. | 74/336 R |

FOREIGN PATENT DOCUMENTS 134150 11/1978 Japan ...................................... 74/745
2063395 6/1981 United Kingdom ................... 74/745

Primary Examiner—Allan D. Herrmann
Attorney, Agent, or Firm—Frank G. McKenzie; Donald J. Harrington

[57] ABSTRACT

A creeper speed mechanism includes a speed reduction gearset driven by an engine through selectively engaged, hydraulically actuated clutches, which are pressurized and vented alternately to produce a high speed ratio and a low speed ratio gear reduction between the engine and the creeper speed mechanism. A coupler connects alternately the creeper speed mechanism and the engine to the transmission input shaft in accordance with the position of a shift rail slidably mounted within the transmission casing. The hydraulic system that actuates the clutches pressurizes a cylinder and moves the shift rail and coupler to engage the creeper speed mechanism. A compression spring moves the coupler away from the creeper speed mechanism and toward engagement with the clutch output. The clutches are vented each time the coupler is moved to a neutral position out of engagement with the creeper speed mechanism and the clutch output.

10 Claims, 2 Drawing Figures

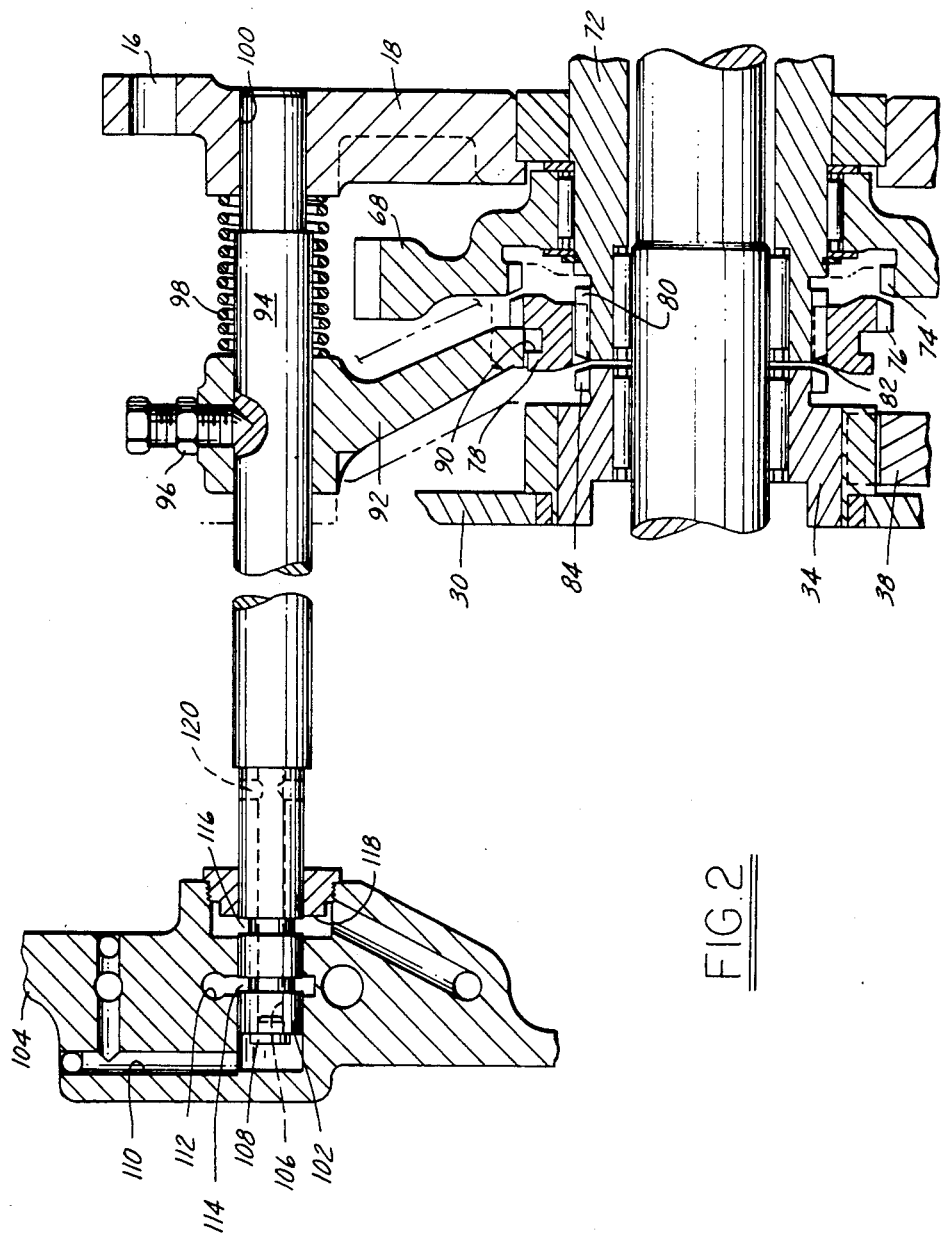

CREEPER SPEED ACTUATOR FOR A TRACTOR TRANSMISSION

BACKGROUND OF THE INVENTION

1. Field of the Invention

This invention relates to a multiple speed ratio tractor transmission. More particularly, the invention pertains to a hydraulically actuated mechanism to engage the creeper speed gear ratios of the transmission.

2. Description of the Prior Art

Tractor transmissions are designed to produce a larger number of gear ratios within a mechanism located between the engine and the final drive or differential mechanism. In the conventional design, the gear arrangement of the transmission may produce a gear reduction or ratio of approximately 9:1 between the speed of the transmission output and the engine speed. Typically, the torque delivery path of a tractor transmission includes a creeper speed mechanism located behind the transmission gear arrangement and before the differential mechanism. The creeper speed mechanism produces an additional speed reduction of about 5:1 between the output of the transmission gear arrangement and the output of the creeper speed mechanism. This combination of speed ratios will produce an overall speed reduction of approximately 45:1 between the output of the creeper speed mechanism and the engine.

Because the creeper speed mechanism is an additional gear mechanism located in conventional tractor drivelines at the rear of the transmission, its presence increases the overall length of the transmission. It is preferable that the creeper speed mechanism be as short as possible so that the transmission can be fitted within the smallest space possible. Yet to produce a sufficiently large speed reduction between the engine and the transmission output required by tractor operators for certain conditions, the creeper speed mechanism must include several speed reductions which necessarily increase the space required by the mechanism.

SUMMARY OF THE INVENTION

The creeper speed mechanism according to the present invention includes two clutches carried on a shaft that is driveably connected by a neutral clutch to an engine. The clutches are engaged selectively by connecting a source of pressurized fluid to the respective clutch pistons. When the shift lever of the transmission is moved among the various speed ratios, for example, when the lowest speed ratio is selected by the tractor operator, a hydraulic valve opens communication between one of the clutches and the pressurized fluid source. If a higher speed ratio is required, movement of the shift selector to the higher gear ratio closes the connection to the first clutch and communicates the fluid pressure source to the second clutch.

A countershaft rotatably mounted on the transmission casing parallel to the axis of the shaft that is connected to the engine, carries pinions which turn with the countershaft and are engaged respectively with the output component of the first and second clutches. In addition to these pinions, a third pinion carried on the countershaft is continuously engaged with a creeper gear carried rotatably on the transmission input shaft. This pinion and the creeper gear produce a speed reduction between the countershaft and the input shaft.

A coupler, slideably mounted on the input shaft, moves between a position where the coupler is connected to the creeper gear and another position where the coupler is connected to the output component of one of the clutches. The coupler is continuously, driveably connected to the transmission input shaft. Therefore, movement of the coupler connects either the creeper speed gear or the output component of the clutch to the input shaft.

The gears that are formed integrally with the clutch outputs and the pinions with which they are engaged on the countershaft are sized to produce a torque amplification and speed reduction between the shaft that is connected to the engine and the countershaft. The creeper gear and the pinion with which it is engaged carried on the countershaft are sized to produce an additional speed reduction and torque application between the countershaft and the transmission input shaft. The output of one of the hydraulically actuated clutches is connected by the coupler directly to the transmission input shaft. When the other hydraulic clutch is actuated and the coupler is positioned other than for creeper operation, the transmission input shaft is overdriven with respect to the engine shaft. However, when the coupler is moved into engagement with the creeper gear, the output of the first clutch drives a pinion on the countershaft, which produce a speed reduction. The connection that the coupler makes with the creeper gear produces a second speed reduction between the speed of the countershaft and the transmission input shaft.

In the arrangement according to this invention, when the coupler is located at the normal drive position, the transmission input shaft is either overdriven with respect to the engine speed or it is directly connected to the engine. Otherwise, when the coupler is positioned for creeper speed operation, the two speed ratios that result from selective engagement of the first and second clutches and the speed reduction associated with the creeper speed mechanism produce two larger speed reductions between the engine and the transmission input shaft.

The creeper speed mechanism is hydraulically actuated according to this invention. A shift rail is journalled slideably on the the transmission casing. At one end of the shift rail, the hydraulic system supplies pressurized hydraulic fluid to the cylinder in which the shift rail is journalled to move the coupler to a position where the creeper speed mechanism is driveably connected to the transmission input shaft. A compression spring operating against the effect of the hydraulic pressure tends to move the coupler away from the position where the driveable connection between the creeper speed mechanism and the input shaft is made. Passages are formed in the shift rail, which connect both of the dual power hydraulic clutches to sump when the coupler is moved to a neutral position, where the coupler driveably connects neither the creeper speed mechanism nor the clutch to the input shaft. In this way, the engine is driveably disconnected from the dual power mechanism and from the creeper speed mechanism when the coupler is in the neutral position. For this reason, a simple unsynchronized connection can be used between the creeper speed mechanism and the input shaft without the need to provide a complex, costly and larger synchronizer because the engagement is made while power is disconnected from the coupler and the components joined by the coupler. When the gear selector of the tractor transmission is moved away from the creeper speed position and toward the normal drive position, an electrical switch is actuated to change the state of an electrical solenoid valve, which opens and closes communication between the source of pressurized hydraulic fluid and the hydraulic cylinder in which the shift rail is slideably mounted. This permits the shift rail to move forward to a position where a driveable connection is made between the engine and transmission input shaft, either directly or through a dual power speed reduction gearset.

BRIEF DESCRIPTION OF THE DRAWINGS

FIG. 2 is a cross section through the axis of the transmission input shaft and the creeper speed mechanism shift rail.

DESCRIPTION OF THE PREFERRED EMBODIMENT

Figure 1:
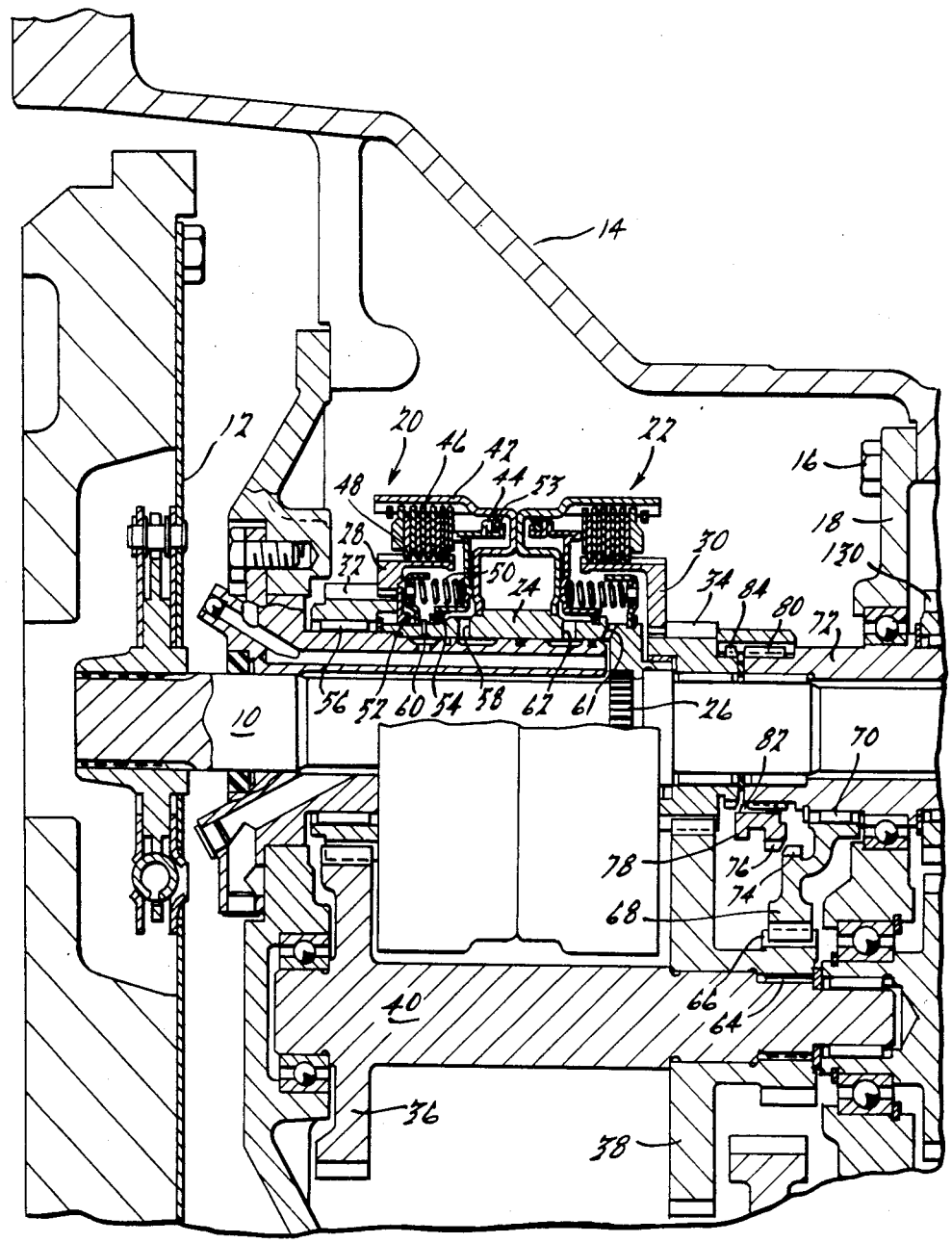
FIG. 1 is a cross section through a plane that contains the axes of the engine shaft and transmission input shaft at the front portion of a tractor transmission according to this invention.

Referring first to FIG. 1, the output shaft of an engine is driveably connected to the power take off shaft 10 of a tractor transmission through a neutral clutch 12. The transmission is housed in a casing 14 comprising several segments which are joined at bolted connections 16. A bulkhead or web 18, connected to the casing, supports various shafts, gears, clutches and synchronizers.

A first hydraulically actuated disc clutch assembly driveably connects shaft 10 to first and second output components of the clutches. For example, when a first clutch 20 or a second clutch 22 is engaged, shaft 10 is connected to clutch output components 28 or 30, respectively. The input element 24 of the clutches is joined at a spline 26 to shaft 10; their output components 28, 30 are rotatably supported on the shaft and are formed integrally with gears 32, 34, which are in continuous meshing engagement with pinions 36, 38. These pinions are rotatably supported on countershaft 40, which is substantially parallel to the axis of shaft 10.

Clutch 20 includes a hydraulic cylinder 42 driveably connected to the input component 24, a piston 44, a first set of clutch discs 46 splined to the cylinder 42, a second set of clutch discs 48 splined to output component 28, a spring retainer 52, a coiled compression spring 50 fitted between the spring retainer and the piston, seals 53, 54 for hydraulically sealing the pressurized portion of the cylinder from the unpressurized portion, and a bearing 56 for rotatably supporting the output component on shaft 10. The hydraulic system of the transmission connects a source of high pressure hydraulic fluid through a hydraulic passage 58 to the interior of the cylinder. The low pressure portion of the cylinder is connected by passage 60 to a reservoir or sump at atmospheric pressure.

Clutch 22 includes corresponding components to those described with respect to clutch 20 and functions in the same way as clutch 20 when its cylinder is pressurized through passage 62 from the source of hydraulic pressure. Clutches 20 and 22 are operated alternately; they are not fully engaged concurrently during any of the forward drive, reverse drive or creeper speed ratio conditions.

When clutch 20 is energized, its cylinder is pressurized and the clutch discs 46, splined to the cylinder, are forced into frictional contact with discs 48, splined on the output component 28. When the pressure in the cylinder rises sufficiently, the input component 24 is driveably connected to the output component 28 and driveably connects shaft 10 and gear 32. Similarly, when clutch 22 is pressurized, a driveable connection is made through engagement of the corresponding disc sets between shaft 10 and gear 34.

Pinion 36 is formed integrally with countershaft 40, and pinions 38, 66 are connected by spline 64 to the countershaft. Pinion 66 is in continuous engagement with creeper gear 68, which is rotatably mounted by bearing 70 on the outer surface of the transmission input shaft 72. Shaft 10, the power takeoff shaft, extends from the front of the transmission to the rear through a bore in shaft 72. The gear wheel on which creeper gear 68 is formed includes a set of dog teeth 74 engageable by a corresponding set of dog teeth 76 located on the circumference of a coupler 78. Located at the forward end of the input shaft is a set of splines 80, with which the splines 82 on the inside diameter of coupler 78 are a continuously engaged. Located at the rearward end of the output component 30 of clutch 22 is a set of dog teeth 84, which is engageable by the splines 82 of the coupler. The coupler is mounted for axial sliding movement on the input shaft and remains continuously engaged with the input shaft.

When coupler 78 is moved rearward from the neutral position shown in the figure, it is brought into driveable engagement with creeper gear 68. When the coupler is moved forward from the neutral position, it is brought into driveable engagement with the output component of clutch 22.

The device according to this invention will produce, through selective operation of clutches 20 and 22, a dual power input between the engine shaft and the input shaft 72 of the transmission. When clutch 20 is engaged, clutch 22 is disengaged, coupler 78 is moved forward to its normal position, and output shaft 72 is overdriven with respect to the engine, i.e., the speed of shaft 72 is greater than the engine speed. When the clutches and coupler are so disposed, power is transmitted from power takeoff shaft 10 through clutch 20, gear 32, pinion 36, spline 64, pinion 38, gear 34 and coupler 78 to the input shaft 72. The relative sizes of the meshing gears and pinions 32, 40 and 38, 34 cause input shaft 72 to be overdriven approximately 1.6 times the speed of shaft 10.

When clutch 22 is engaged, clutch 20 is disengaged and coupler 78 is moved forward to its normal position, shaft 10 is connected to the input shaft 72 through the torque delivery path that includes spline 26, the discs of clutch 22, output component 30 and coupler 78. This torque delivery path causes the input shaft 72 to be driven at the speed of shaft 10.

The dual power input mechanism connects the engine through clutches 20 and 22 either directly to the transmission input or through the speed reduction gearset to the transmission input. However, in addition to the dual power input, the creeper mechanism according to this invention has the capacity to produce a speed reduction between the engine and the transmission input by moving the coupler rearward from the position of engagement with the output of clutch 22 and into engagement with creeper gear 68. When this is done, selective engagement of clutches 20 and 22 produces two ratios of the speed of the input shaft with respect to the engine shaft.

The creeper speed mechanism produces the higher creeper speed ratio or the lower torque ratio when clutch 20 is engaged, clutch 22 is disengaged and coupler 78 is moved rearward to the creeper speed position. With these components so disposed, the torque delivery path between shaft 10 and input shaft 72 includes clutch 20, gear 32, pinion 36, creeper pinion 66, creeper gear 68, dog teeth 74, 76 and coupler 78.

The creeper speed mechanism produces the lower creeper speed ratio or the higher torque ratio when clutch 20 is disengaged, clutch 22 is engaged and coupler 78 is moved rearward to bring its dog teeth 76 into engagement with the the dog teeth 74 on the creeper gear wheel 68. With these components so disposed, the torque delivery path that connects shaft 10 to shaft 72 includes clutch 22, gear 34, pinion 38, creeper pinion 66, creeper gear 68, dog teeth 74, 76, and coupler 78.

From the relative sizes of the engaged gears and pinions of this torque path, it can readily be seen that the speed of input shaft 72 is substantially slower than the engine speed. From the relative sizes of the engaged gears and pinions of the other torque path, the input shaft speed is seen to be higher than its speed when clutch 22 is engaged and clutch 20 is disengaged, for a constant engine speed.

Referring now to FIG. 2, the creeper speed mechanism and the adjacent portions of the dual power mechanism that interact with the creeper speed mechanism are shown supported rotatably about the axes of the transmission input shaft and the countershaft. The coupler 78 is located in the neutral position.

The coupler has an annular recess 90, which is engageable by fingers at the end of a shift fork 92 slideably supported on a shift rail 94. The shift fork is mechanically connected to the rail by a bolted connection 96 so that these components move as a unit forward and rearward in accordance with the effect of hydraulic forces developed on the shift rail and the of a coiled compression spring 98 fitted between the web 18 that is fixed to the transmission casing and the end face of the shift fork. Spring 98 urges the shift rail forward within a journalled bearing surface 100, formed in the web at the rearward end, and within a hydraulic cylinder 102, formed in another web 104 at the forward end of the rail.

The forward end of the shift rail has a central axial hole 106, which is closed at one end by a plug 108 threaded within the hole and closed at the opposite end by terminating the hole-cutting tool. Plug 108 maintains the end face of the shift rail away from the head of cylinder 102 so that a hydraulic force tending to move the shift rail rearward is continually present on the end face of the shift rail while the cylinder is pressurized.

Two axially spaced annular grooves 114, 116 formed on the outer surface of the rail are spaced axially along the rail and are located along the rail so that they communicate respectively with hydraulic ports 112 and 118, each of which communicates with one of the dual power clutches 20, 22. Grooves 114, 116 intersect axial hole 106, which is intersected also by a transversely directed port 120, which is continuously vented and communicates with the transmission sump.

When coupler 78 is in the neutral position, where its outer spline 76 is disengaged from the creeper gear 68 and its inner spline is disengaged from dog teeth 84 on the output 30 of clutch 22, annular groove 114 is aligned with port 112 and groove 116 is aligned with port 118. Therefore, when the coupler is in the neutral position, the dual power clutches are vented through hydraulic passages 112, 118, 106 and 120 in addition to the vent ports 60, 61 located within the clutch assembly itself.

When creeper speed operation is selected, a valve, such as an electrically operated solenoid valve energized from a source of electric power through the closure of an electric switch, directs pressurized fluid through port 110 to the end of cylinder 102. The pressure force developed on the face of rail 94 forces the rail rearward, closes communication between annular grooves 114, 116 and ports 112, 118, carries shift fork 92 rearward against the effect of spring 98 and forces coupler 78 into engagement with dog teeth 74 on the creeper gear 68. With the components of the creeper speed mechanism so disposed, dual power clutches 20 and 22 are vented only through the hydraulic ports located within the clutch assembly, but not through the vent ports of the creeper speed mechanism actuator. Therefore, these clutches can be selectively engaged and disengaged to produce a high speed ratio and a low speed ratio in the creeper speed range by alternately pressurizing and venting the dual power clutches.

When the creeper speed selector is moved from the creeper speed position to the normal drive position, the valve through which hydraulic passage 110 is pressurized opens passage 110 to the sump and removes the hydraulic pressure force on the end of rail 94. Then, the force of spring 98 moves rail 94 forward until plug 108 contacts the head of cylinder 102. In this position, grooves 114, 116 are closed to ports 112 and 118, so that the dual power clutches are vented through vent ports 60 and 61 but not through the vent ports of the creeper speed actuator system. Therefore, by selectively pressurizing and venting clutches 20 and 22, a high and a low speed ratio can be produced by the dual power speed mechanism.

Through the use of the creeper speed mechanism, its actuator and the creeper speed selector according to this invention, it is assured that clutches 20 and 22 are vented before coupler 78 is moved to a position of engagement with the creeper gear wheel. By venting these clutches, the creeper speed mechanism can be connected to the input shaft of the transmission by a simple, unsynchronized sliding coupler. When the clutches are vented, countershaft 40 has no power applied to it from the engine and the creeper mechanism is driveably disconnected from the engine.

Having described a preferred embodiment of my invention, what I claim and desire to secure by U.S. Letters Patent is:

1. A creeper speed actuator system for a tractor transmission comprising:
   a first shaft adapted to be clutched to an engine;
   a transmission input shaft;
   creeper speed reduction means for reducing the speed of the transmission input shaft relative to the speed of the first shaft;
   coupler means for driveably connecting and disconnecting the creeper speed reduction means and the transmission input shaft;
   actuating means for moving the coupler means to driveably connect and disconnect the creeper speed reduction means and the transsission input shaft and to disable the coupler means;
   clutch means for directly selectively driveably connecting the first shaft to the creeper speed reduction means; and means for disengaging said clutch means when the coupler means disconnects the creeper speed reduction means and the transmission input shaft.

2. The system of claim 1 wherein the actuating means inclues:
a hydrualic cylinder;
a shift rail slidably mounted in the hydraulic cylinder;
a shift fork carried on the shift rail and connected to the coupler means;
means for supplying pressurized hydrualic fluid to the cylinder and to the clutch means; and
means for venting the hydraulic cylinder when the coupler means disconnected the creeper speed reduction means and the transmission input shaft.

3. The system of claim 2 wherein the clutch disengaging m ®ans includes:
passage means for connecting the clutch means to the hydraulic cylinder;
vent port means for connecting the passage means to vent; and
valve means for connecting the vent port means and the passage means when the coupler means disconnects the creeper speed reduction means and the transmission input shaft.

4. A creeper speed reduction system for a tractor transmission comprising:
a first shaft clutched to an engine;
a transmission input shaft;
creeper speed reduction means for reducing the speed of the transmission input shaft relative to the speed of the first shaft;
coupler means for selectively driveably connecting and disconnecting the creeper speed reduction means and the transmission input shaft;
actuating means for moving the coupler means among a first position where the creeper speed reduction means is connected to the transmission shaft, a second position where the first shaft is connected to the transmission input shaft, and a neutral position where the coupler means makes no connection to the transmission shaft;
clutch means for directly selectively driveably connecting and disconnecting the first shaft to the creeper speed reduction means; and
means for disengaging said clutch means when the coupler is located at the neutral position.

5. The system of claim 4 comprising:
a hydraulic cylinder;
a shift rail slidably mounted in the hydraulic cylinder;
a shift fork carried on the shift rail and connected to the coupler means;
means for supplying pressurized hydraulic fluid to the cylinder and to the clutch means, whereby the coupler is moved to the first position and the clutch means is engaged; and
means for venting the hydraulic cylinder when the coupler means disconnects the creeper speed reduction means and the transmission input shaft.

6. The system of claim 5 comprising:
passage means for connecting the clutch means to the hydraulic cylinder;
vent port means for connecting the passage means to vent; and
valve means for connecting the vent port means and the passage means when the coupler means disconnects the creeper speed reduction means and the transmission input shaft.

7. In a tractor transmission, a creeper speed actuator system comprising:
a first shaft adapted to be clutched to an engine;
a transmission input shaft;
creeper speed reduction means including a first speed reduction means for reducing the speed of and increasing the torque transmitted to the transmission input shaft in comparison to the speed and torque of the first shaft;
coupler means for driveably connecting and disconnecting the creeper speed reduction means and the transmission input shaft;
first and second clutch means for selectively driveably connecting the first shaft to respective outputs of the first and second clutch means;
actuating means for moving the coupler means to driveably connect and disconnect the creeper speed reduction means and the transmission input shaft and to connect and disconnect the input shaft and the first speed reduction means, and including a hydraulic cylinder, a shift rail slidably mounted in the hydraulic cylinder, a shift fork carried on the shift rail conncted to the coupler means, means for supplying pressurized hydraulic fluid to the cylinder and to the clutches, means for venting the hydraulic cylinder when the coupler means disconnects the creeper speed reduction means and the transmission input shaft; and
means for venting the first and second clutch means when the coupler means disconnects the creeper speed reduction means and the transmission input shaft.

8. The actuator system of claim 7 wherein the clutch venting means includes passage means for connecting the first and second clutches to the cylinder;
vent port means formed in the shift rail for connecting the passage means to vent; and
valve means form on the shift rail for opening communication between the vent port means and the passage means when the coupler means is disconnecting the creeper speed reduction means and the transmission input shaft.

9. In a tractor transmission driveably connected to an engine, a creeper speed actuating system comprising:
a first shaft clutched to the engine;
a transmission input shaft;
creeper speed reduction means for reducing the speed of and increasing the torque transmitted to the transmission input shaft in comparison to the speed and torque of the first shaft;
coupler means for selectively driveably connecting the creeper speed reduction means and the first shaft to the transmission input shaft;
first and second clutch means for selectively driveably connecting the first shaft to respective outputs of the first and second clutch means;
actuating means for moving the coupler means between a first position where the creeper speed reduction means is connected to the transmission shaft, a second position where the first shaft is connected to the transmission input shaft, and a neutral position where the coupler means makes no connection to the transmission input shaft, and including a hydraulic cylinder, a shift rail slidably mounted in the hydraulic cylinder, a shift fork carried on the shift rail connected to the coupler means, means for supplying pressurized hydraulic fluid to the cylinder and to the clutches, and means for venting the hydraulic cylinder when the coupler means disconnects the creeper speed reduction means and the transmission input shaft; and means for venting the first and second clutch means when the coupler means disconnects the creeper speed reduction means and the transmission input shaft.

10. The actuator system of claim 9 wherein the clutch venting means includes passage means for connecting the first and second clutches to the cylinder;
vent port means formed in the shift rail for connecting the passage means to vent; and
valve means formed on the shift rail for opening communication between the vent port means and the passage means when the coupler means is disconnecting the creeper speed reduction means and the transmission input shaft.

* * * * *